US010320758B2

(12) United States Patent
Jawaharlal et al.

(10) Patent No.: US 10,320,758 B2
(45) Date of Patent: Jun. 11, 2019

(54) CRYPTOGRAPHY USING MULTI-FACTOR KEY SYSTEM AND FINITE STATE MACHINE

(71) Applicant: INTERNATIONAL BUSINESS MACHINES CORPORATION, Armonk, NY (US)

(72) Inventors: Samuel M. Jawaharlal, Chennai (IN); Arunachalam Narayanan, Chennai (IN); Sathya Santhar, Chennai (IN); Balamurugaramanathan Sivaramalingam, Ramanathapuram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 15/496,020

(22) Filed: Apr. 25, 2017

(65) Prior Publication Data
US 2018/0309737 A1 Oct. 25, 2018

(51) Int. Cl.
G06F 11/30 (2006.01)
H04L 29/06 (2006.01)
(Continued)

(52) U.S. Cl.
CPC ........... H04L 63/0442 (2013.01); H04L 9/14 (2013.01); H04L 9/30 (2013.01)

(58) Field of Classification Search
None
See application file for complete search history.

(56) References Cited

U.S. PATENT DOCUMENTS 5,095,432 A * 3/1992 Reed ............... G06F 17/271
704/9
6,154,541 A * 11/2000 Zhang ............. H04L 9/3073
380/28
(Continued)

FOREIGN PATENT DOCUMENTS

WO 2006078558 A2 7/2006
WO 2015028830 A1 3/2015

OTHER PUBLICATIONS

"Secure Encryption Scheme of Amazigh Alphabet Based ECC Using Finite State Machine", Fatima Amounas and El Hassan Ei Kinani, R.O.I Group, Moulay Ismaïl University, 2013 IEEE (Year: 2013).*

(Continued)

Primary Examiner — Gary S Garcia
(74) Attorney, Agent, or Firm — Michael O'Keefe; Matthew M. Hulihan; Heslin Rothenberg Farley & Mesiti PC

(57) ABSTRACT

A process selects a public key from a plurality of public keys provided by a message recipient that is to receive an encrypted message. The process establishes an input alphabet for a finite-state machine. The process further constructs the finite-state machine and a language over the input alphabet such that the finite-state machine accepts the language, where the language includes language elements. The process encrypts a language element of the language using the selected public key to provide an encrypted language element. The process electronically transmits the encrypted language element and a specification of the finite-state machine to the message recipient for securely identifying the selected public key to the message recipient. The process encrypts a message using the selected public key to provide (Continued)

the encrypted message. The process also electronically transmits the encrypted message to the message recipient.

20 Claims, 8 Drawing Sheets

(51) Int. Cl.
*H04L 9/14* (2006.01)
*H04L 9/30* (2006.01)
*G06F 12/14* (2006.01)

(56) References Cited

U.S. PATENT DOCUMENTS

| | | | | |
|---|---|---|---|---|
| 7,149,310 B2* | 12/2006 | Sandhu | ............... | H04L 9/3271 380/278 |
| 7,386,720 B2* | 6/2008 | Sandhu | ............... | H04L 9/3271 380/277 |
| 7,734,045 B2* | 6/2010 | Sandhu | ............... | H04L 9/302 380/44 |
| 8,144,874 B2* | 3/2012 | McGough | ............ | H04L 63/062 380/277 |
| 8,340,287 B2* | 12/2012 | Sandhu | ............... | H04L 9/0825 380/44 |
| 8,601,590 B2* | 12/2013 | Nakano | ............... | G06F 21/16 705/57 |
| 9,338,142 B2* | 5/2016 | Dottax | ............... | H04L 9/302 |
| 2008/0056501 A1* | 3/2008 | McGough | ............ | H04L 63/062 380/281 |
| 2009/0092251 A1* | 4/2009 | Domosi | ............... | H04L 9/001 380/255 |
| 2009/0245515 A1* | 10/2009 | Bond | ............... | H04L 9/0891 380/255 |
| 2012/0173878 A1* | 7/2012 | Boehl | ............... | H04L 9/003 713/176 |
| 2016/0119119 A1* | 4/2016 | Calapodescu | ............ | H04L 9/30 380/30 |

OTHER PUBLICATIONS

Amorim, Ivone, et al., "On Linear Finite Automata and Cryptography", Technical Report Series: DCC-2011-11, Version 1.0, Aug. 2011, 15 pgs.

Rouse, Margaret, "multifactor authentication (MFA)" [retrieved on Mar. 20, 2017]. Retrieved from the Internet URL (http://searchsecurity.techtarget.com/definition/multifactor-authentication-MFA>, 9 pgs.

Fleischhacker, Nils, "A Modular Framework for Multi-Factor Authentication and Key Exchange", 2014, 24 pgs.

Kearns, Michael, et al., "Cryptographic Limitations on Learning Boolean Formulae and Finite Automata," [retrieved on Mar. 20, 2017]. Retrieved from the Internet URL <https://www.cis.upenn.edu/~mkearns/papers/crypto.pdf>, 44 pgs.

Tao, Renji, "Finite Automaton Public Key Cryptosystems", 2009, pp. 347-393 (chapter 9).

Mell, Peter, et al., "The NIST Definition of Cloud Computing", NIST Special Publication 800-145, Sep. 2011, Gaithersburg, MD, 7 pgs.

* cited by examiner

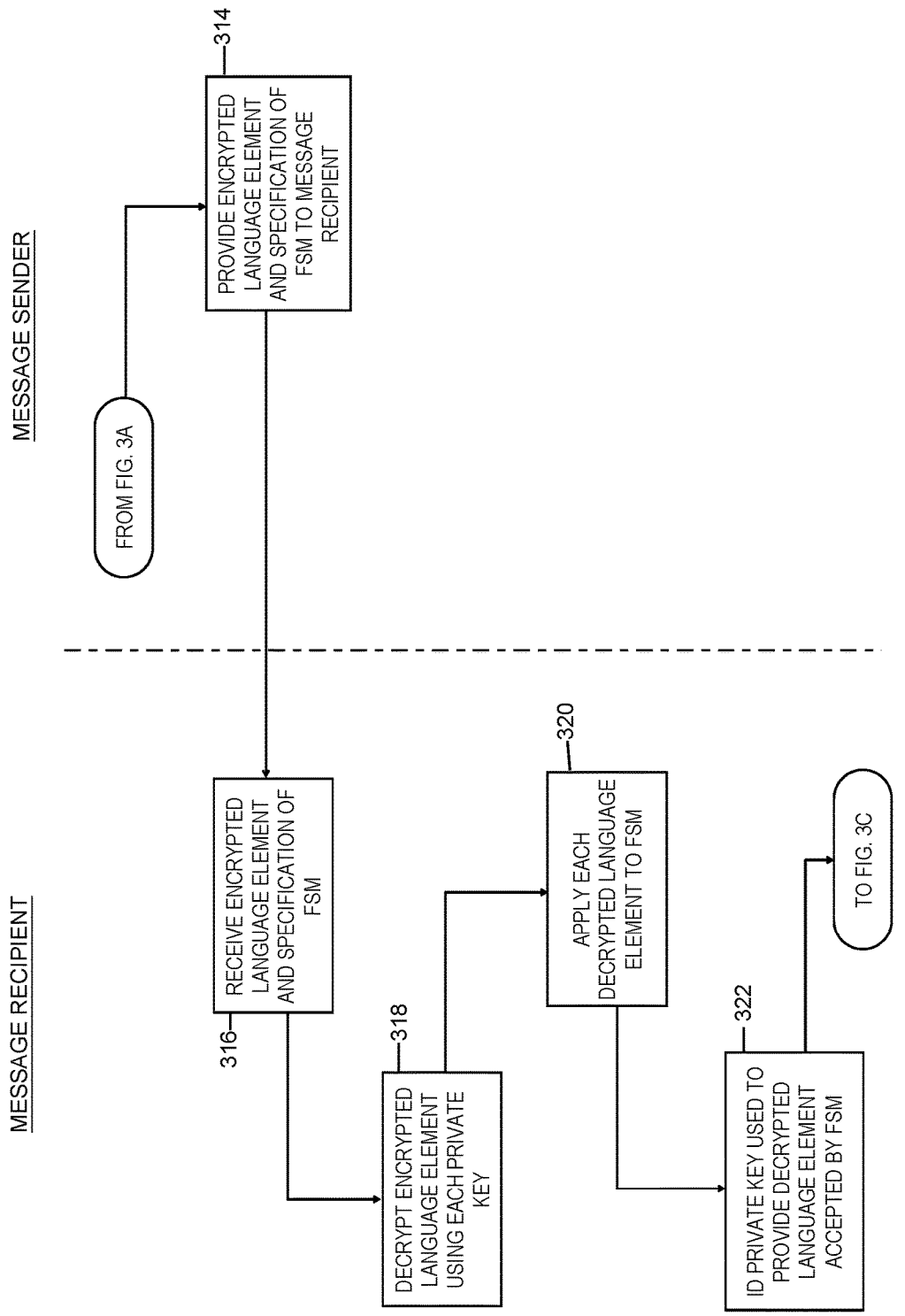

CRYPTOGRAPHY USING MULTI-FACTOR KEY SYSTEM AND FINITE STATE MACHINE

BACKGROUND

Asymmetric encryption is used in a wide range of applications including bank transfers, shopping, broadcasting and others. When working with asymmetric encryption, the difficulty in decrypting an encrypted message is due to factors like non-availability of the private keys and issues surrounding the factorization a relatively large number (in the case of algorithms like RSA), or difficulty in determining a number of times a point on a curve is multiplied (in the case of elliptical curve cryptography), as examples. Asymmetric encryption may be preferred to a private key cryptosystem in order to avoid the key distribution problem and easy deciphering of the encrypted message. However, increases in computational power of smart machines and innovations in quantum computing make it increasingly easier to 'crack' encryption because the mathematical operations to do so may be performed faster and faster. Generally this has been addressed by increasing the bit length (512, to 1024, now 2048). This advantageously increases the complexity of cracking the encryption, but disadvantageously for the message sender and recipient renders the mathematics involved in the encryption and decryption more demanding in terms of resources.

SUMMARY

Shortcomings of the prior art are overcome and additional advantages are provided through the provision of a computer-implemented method. The method selects a public key from a plurality of public keys provided by a message recipient that is to receive an encrypted message. The method establishes an input alphabet for a finite-state machine. The method further constructs the finite-state machine and a language over the input alphabet such that the finite-state machine accepts the language, where the language includes language elements. The method encrypts a language element of the language using the selected public key to provide an encrypted language element. The method electronically transmits the encrypted language element and a specification of the finite-state machine to the message recipient for securely identifying the selected public key to the message recipient. The method encrypts a message using the selected public key to provide the encrypted message. The method also electronically transmits the encrypted message to the message recipient.

Further, a computer program product including a computer readable storage medium readable by a processor and storing instructions for execution by the processor is provided for performing a method. The method selects a public key from a plurality of public keys provided by a message recipient that is to receive an encrypted message. The method establishes an input alphabet for a finite-state machine. The method further constructs the finite-state machine and a language over the input alphabet such that the finite-state machine accepts the language, where the language includes language elements. The method encrypts a language element of the language using the selected public key to provide an encrypted language element. The method electronically transmits the encrypted language element and a specification of the finite-state machine to the message recipient for securely identifying the selected public key to the message recipient. The method encrypts a message using the selected public key to provide the encrypted message. The method also electronically transmits the encrypted message to the message recipient.

Yet further, a computer system is provided that includes a memory and a processor in communications with the memory, wherein the computer system is configured to perform a method. The method selects a public key from a plurality of public keys provided by a message recipient that is to receive an encrypted message. The method establishes an input alphabet for a finite-state machine. The method further constructs the finite-state machine and a language over the input alphabet such that the finite-state machine accepts the language, where the language includes language elements. The method encrypts a language element of the language using the selected public key to provide an encrypted language element. The method electronically transmits the encrypted language element and a specification of the finite-state machine to the message recipient for securely identifying the selected public key to the message recipient. The method encrypts a message using the selected public key to provide the encrypted message. The method also electronically transmits the encrypted message to the message recipient.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A-3C depict an example process for cryptographic processing using a multi-factor key system and finite state machine, in accordance with aspects described herein;

DETAILED DESCRIPTION

Figure 1:
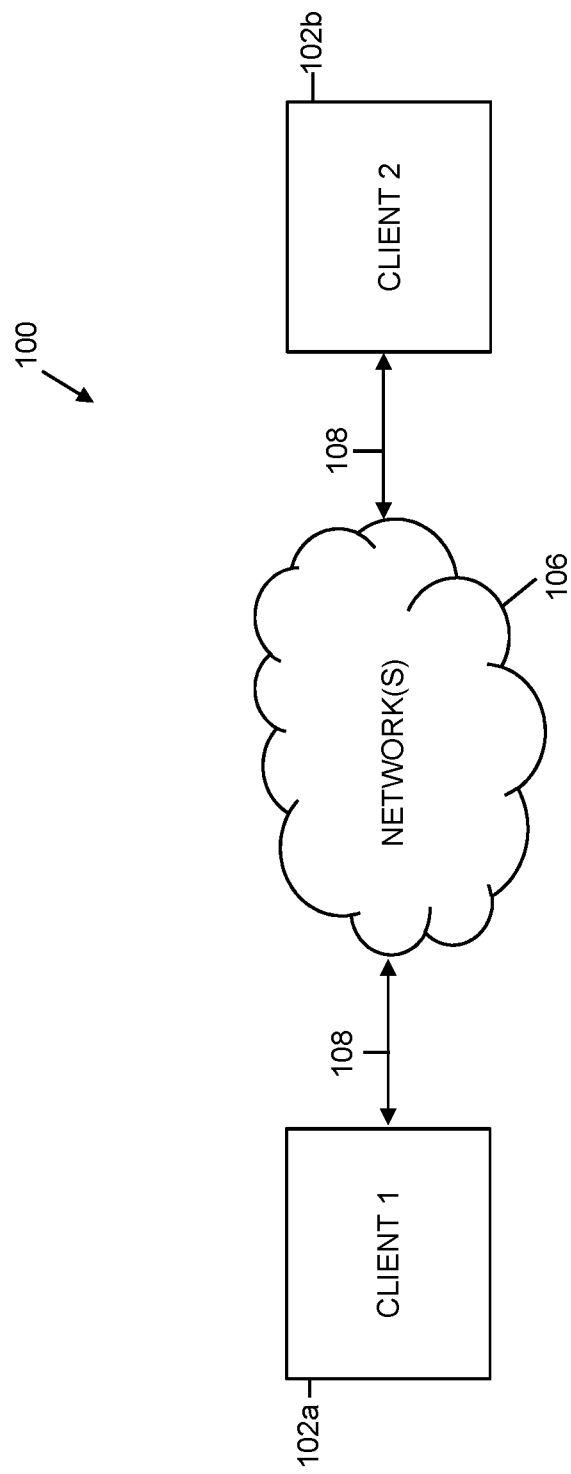
FIG. 1 depicts an example environment to incorporate and use aspects described herein.

Asymmetric encryption is widely used, as noted, to provide an acceptable level of security in various applications. Digital signatures can be used to authenticate that a message has originated from the intended sender, using methods like hash functions along with auxiliary cryptographic functions. Automata theory employing finite automata machines (referred to interchangeably herein as finite state machines) can be used to encrypt and decrypt a message—for instance a Moore's machine could accept a plain message to create an encrypted message, the reverse of such transformation being done on the receiver side using the same machine.

The following presents an example current RSA asymmetric cryptographic processing procedure using public and private keys:

1. Generate two relatively large, random prime numbers, p and q, of approximately equivalent size.

2. Compute n=p*q; n is used as the modulus for both the public and private keys. p and q are chosen such that n is of a desired length, for instance 1024 bits. This length will be the public and private key length.

3. Calculate $\Phi(n)=(p-1)(q-1)$.

4. Select public exponent e such that $1<e<\Phi(n)$ and the greatest common divisor (gcd) of e and $\Phi(n)=1$.

5. Select secret exponent d, such that $1<d<\Phi(n)$ and $e*d=1 \pmod{\Phi(n)}$.

6. The public key can be represented as (n,e). The private key can be represented as (n,d).

7. With text/message m: Encryption->ciphertext $c=m^e$ mod n; and Decryption->$m=c^d$ mod n.

With respect to integral factoring and cracking in the above approach, anyone can tap the network or other communication medium to read the modulus n and public key e sent from one end to the other end. The message can be deciphered only if the private key d is identified, which is not sent over the network and is instead retained securely at one end. The private key d can be obtained by performing modulo inversion using an extended Euclidean algorithm $d=e-1 \bmod \Phi(n)$. But to perform modulo inversion, $\Phi(n)$ needs to be determined from modulo n which is possible only if the prime numbers are identified through integral factoring of all numbers less than $\sqrt{n}$.

The RSA approach historically selected modulo n of relatively small bit length (256 bits). As computer processing became faster, factorization became less challenging and, to counteract this, the recommended bit length for acceptable security was increased to 512, then 1024, then 2048, etc. Current requirements from National Institute of Standards and Technology (NIST) Security Publication 800-57 dictates an RSA key of at least 3072 bit length. While this increases the complexity of cracking the encryption, it also renders the mathematics involved in the encryption and decryption performed by the communicating parties more demanding in terms of resources. Therefore, aspects described herein introduce a cryptographic processing procedure that combines finite automata principles with RSA. Automata theory is leveraged to securely convey to one party the identity of the random key pair selected by the other party.

FIG. 1 depicts an example environment 100 to incorporate and/or use aspects described herein, such as an environment in which users exchange encrypted messages. Client computer systems 102a and 102b communicate via one or more intervening networks 106, for instance one or more local area networks and/or wide areas networks, for instance the internet. Specifically, clients 102a and 102b are in communication with network(s) 106 and each other via wired and/or wireless communications links 108, such as wired and/or cellular, Wi-Fi, or other types of wireless connections. More generally, communications links 108 may be any appropriate wireless or wired communication link(s) for communicating data. The communication between clients 102a and 102b can include sending and receiving of encrypted messages. In a particular example, a recipient of an encrypted message sent from a message sender is to decrypt the message. To aid in this procedure, the message recipient may publish, e.g. on a website or through some other available means, public keys from which the message sender selects a public key to use to encrypt the message.

Figure 2:
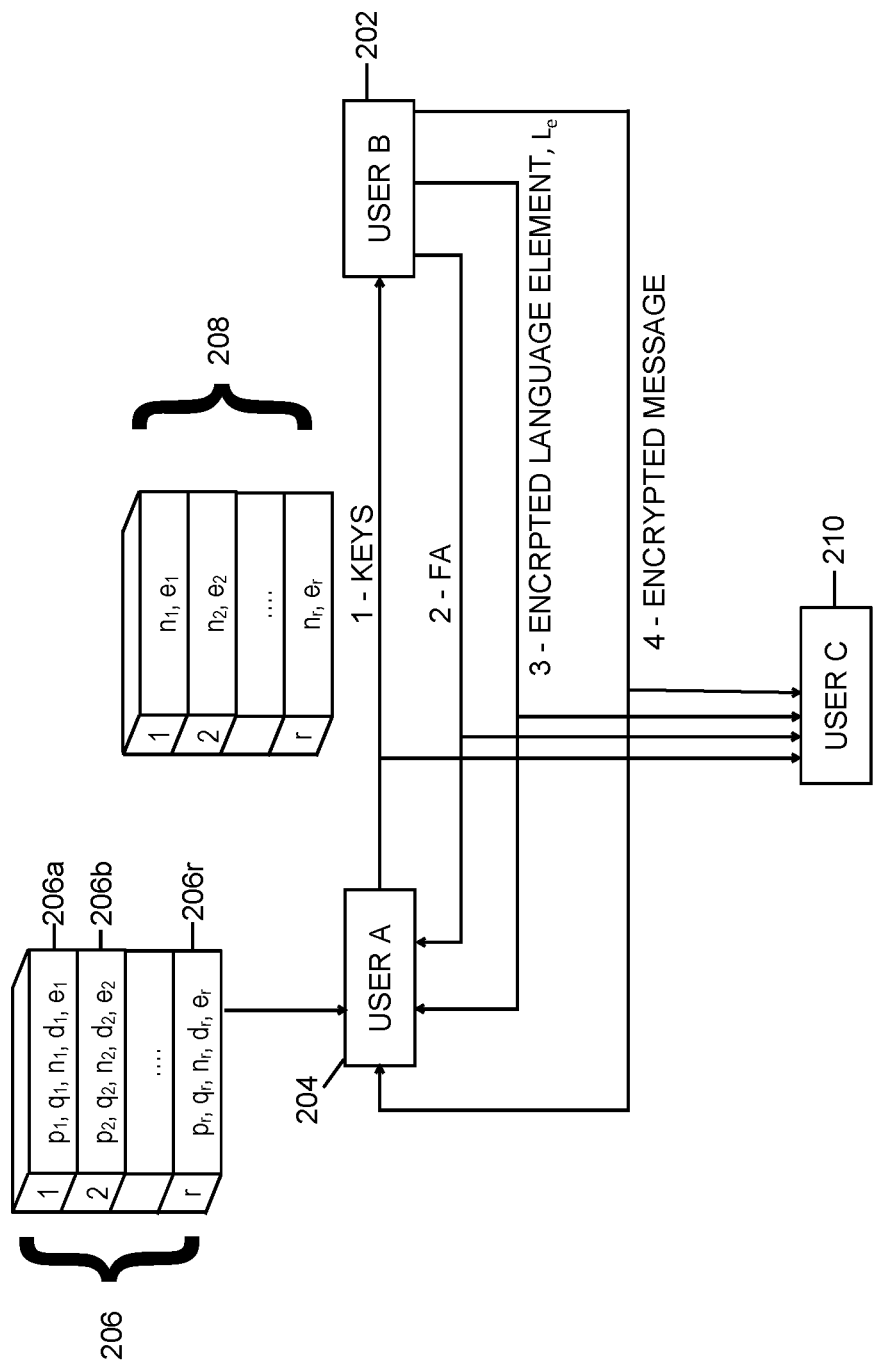
FIG. 2 depicts an example conceptual model of cryptographic processing using a multi-factor key system and finite state machine, in accordance with aspects described herein.

FIG. 2 depicts an example conceptual model of cryptographic processing using a multi-factor key system and finite state machine, in accordance with aspects described herein. In this example, user B 202 desires to send encrypted messages to user A 204. User A 204 establishes a set of cryptographic information 206. The set of cryptographic information 206 includes multiple cryptographic key pairs, each cryptographic key pair including a public key and a private key. In this example, the set of cryptographic information 206 is broken into collections, with each collection having numbers with which RSA encryption may be performed as described above. Collection 206a includes prime numbers ($p_1$ and $p_2$), modulus $n_1$, selected secret exponent $d_1$, and selected public exponent $e_1$ that comport with the above-described RSA approach. Collections 206b through 206r also each include respective prime numbers, modulus, and selected secret and public exponents that comport with the above-described RSA approach. Thus, each collection 206a through 206r includes a public key (n,e) and corresponding private key (n,d), collectively referred to as a key pair.

User A performs (e.g. by way of an accompanying computer system) the following:

A. Select 'r' sets of prime numbers p and q->$\{(p_1,q_1), (p_2,q_2), \ldots (p_r,q_r)\}$.

B. Compute moduli $n_1, n_2, \ldots n_r$ such that $n_a=p_a*q_a$ for each a existing in [1, ..., r] and selection of $(p_a,q_a)$ are made in such a way that modulo $n_a$ does not exceed k bits in length.

C. Calculate $\Phi(n_a)$ for each a existing in [1, ..., r].

D. Derive public and secret components $\{(d_1,e_1), (d_2,e_2), \ldots (d_r,e_r)\}$, such that public exponent e, $1<e_a<\Phi(n_a)$ and gcd $(e_a, \Phi(n_a))=1$ for each a existing in [1, ..., r]; and secret exponent d, $1<d_a<\Phi(n_a)$ and $e_a d_a=1 \pmod{\Phi(n_a)}$.

E. Send or otherwise make available 'r' public keys $\{(n_1,e_1), (n_2,e_2), \ldots (n_r,e_r)\}$ (identified as set 208 in FIG. 2) to user B. This sending is indicated by the arrow labeled '1—Keys' in FIG. 2. In some embodiments, the number of public keys provided to user B is at least 50, and may be in the hundreds or thousands. As will be seen below, the greater number of public keys provided the greater the level of security afforded.

User B performs (e.g. by way of an accompanying computer system) the following:

F. Select a random number 'g' such that $0<g<=r$.

G. Choose from the received pool of r public keys one of these received public keys. Let the chosen public key be represented as $\{n_g,e_g\}$.

H. Select an alphabet $\Sigma$ as a finite set, for instance $\Sigma=\{a, b\}$. The example alphabet here is {a,b}, which happen to be alphabetic letters, but the alphabet $\Sigma$ could be any desired data, for instance numbers like 0 and 1. It is also noted that the selected alphabet may include more than two elements.

I. Select a reference language, L, over $\Sigma$ with a definite and long sequence, for instance (using the above example alphabet) $L=\{a_1 b_s/1, s\geq 0\}=\{a, ab, aba, aaab, abbb, \ldots\}$. It is noted that L is an infinite set in this example. User B will eventually choose an element of that set.

J. Construct a finite state machine $M=(Q, \Sigma, q_0, F)$ with finite states Q, starting state $q_0$, final state F, and transition function $d:Q^x\Sigma \rightarrow Q$ such that M accepts the language L. It is noted that the finite state machine is a well-recognized construct defining an initial state and transition(s) to other state(s) based on a defined transition function.

K. Select an element of the language L and encrypt that element with public key $\{n_g,e_g\}$ to get an encrypted language element $L_e$. It is noted that the machine M should accept the selected element, which will of course be the case if the machine M is constructed properly.

L. Send the machine M and $L_e$ to user A, e.g. over the network, optionally using any encryption algorithm desired. This sending is indicated by the arrows labeled '2—FA' and '3—Encrypted language element, $L_e$' in FIG. 2. It is also noted that the machine may be encrypted, if desired, though it is not required.

User A receives M and $L_e$ and performs (e.g. by way of an accompanying computer system) the following:

N. Decrypt the encrypted language element $L_e$ with each of the 'r' private keys, i.e. using $\{d_1, d_2, \ldots, d_r\}$ to get 'r' number of decrypted versions of encrypted language element $L_e$, i.e. to obtain decrypted language elements $\{L_1, L_2, \ldots, L_r\}$. Since the originally-selected language element (see K above) was encrypted using one of the public keys $\{n_g, e_g\}$ and then decrypted in this step using the corresponding private key (which includes one of $\{d_1, d_2, \ldots, d_r\}$), then one of the r number of decrypted language elements is the one that user B selected (from K above). In this regard, the particular private key and corresponding secret exponent d used to decrypt $L_e$ to obtain each respective decrypted language element may be tracked so that it can later be determined which private key/d was used to obtain each $\{L_1, L_2, \ldots, L_r\}$ from decrypting $L_e$.

O. Apply the r decrypted language elements to machine M. M will accept one (or possibly multiple) of these decrypted language elements. Let $L_m$ be the decrypted language element, of $\{L_1, L_2, \ldots, L_r\}$, that the machine M accepts. This represents the original language element selected and encrypted by user B (at K above). In the event that the machine M accepts more than one of the decrypted language elements $\{L_1, L_2, \ldots, L_r\}$, then in one embodiment user A requests that user B repeat the above beginning from I or prior. The probability that more than one decrypted language element fits the machine would depend at least in part on the language and machine selected by user B.

P. Identify the private key/secret exponent 'd' used to obtain $L_m$. This identifies the private key corresponding to the public key $\{n_g, e_g\}$ that user B initially selected (G, above). In other words, this is the private key that was used to decrypt the encrypted language element to result in the item that machine M accepts, and therefore corresponds to the public key selected by user B (G, above).

Q. Send an acknowledgement to user B. This acknowledgement can serve as an indication that user B can begin sending encrypted messages.

User B can use the selected (G, above) public key to encrypt messages to be sent to user A (indicated by the arrow labeled '4—Encrypted message' in FIG. 2). User A knows the private key it should use to perform the decryption. The use of the FSM and other aspects above drastically enhances security from a hacker or other third party.

Referring still to FIG. 2, assume that users A and B communicate as indicated across a network and that user C 210 taps (e.g. by way of an accompanying computer system) or otherwise has access to all the messages in the network, public keys->$\{(n_1,e_1), (n_2,e_2), \ldots (n_r,e_r)\}$, FSM M, encrypted language element $L_e$, and the encrypted messages being sent from user B to user A. For user C 210 to decrypt an encrypted message, the approach user C would take, not knowing which public key was used by user B, is to factorize each public key using algorithms such as the extended Euclidean algorithm or the Chinese remainder theorem to derive the large prime numbers used. This would need to be done for potentially all 'r' public keys, which increases the complexity 'r' times. In other words, to ensure the hack, the factorization would need to perform factorizations until the proper public key is found.

It is noted also that user C cannot easily derive the proper private key. Since the private key is not derived, user C cannot easily decrypt $L_e$. User C can attempt to decrypt the encrypted language element $L_e$ but could not conclude which is the right language used as there are no reference points. User C will have the machine if it is not encrypted, but the machine could be used merely to indicate whether the decrypted language element is accepted by the machine. The machine cannot be used to extract the language used as it is a template to confirm whether the language is or is not accepted.

It is further noted that in the above example the key pair is being used for user B to send an encrypted message to user A, though aspects described herein may be used in other situations where public/private key pairs are used, for instance in message signing.

Figure 3A:
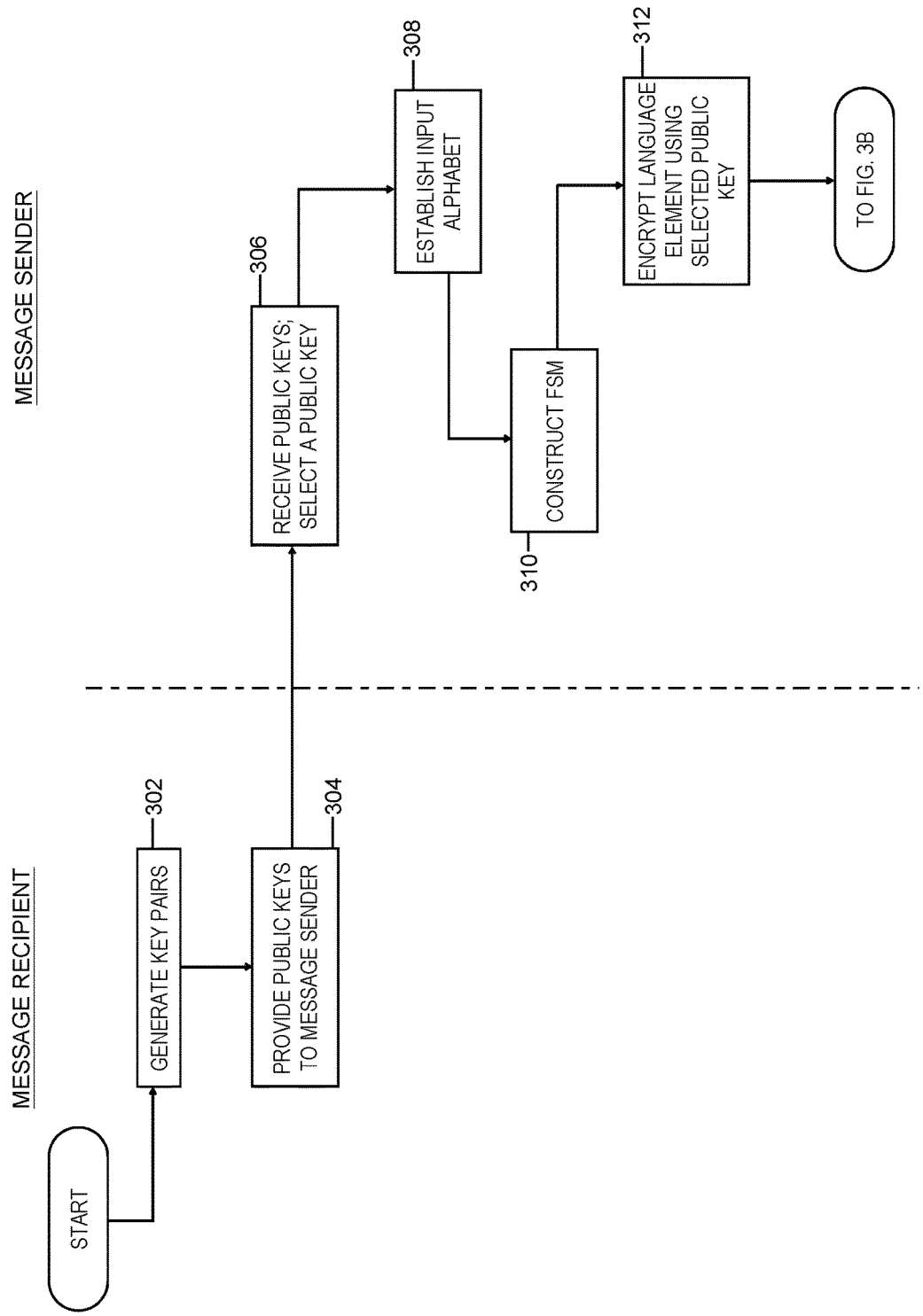
Figure 3C:
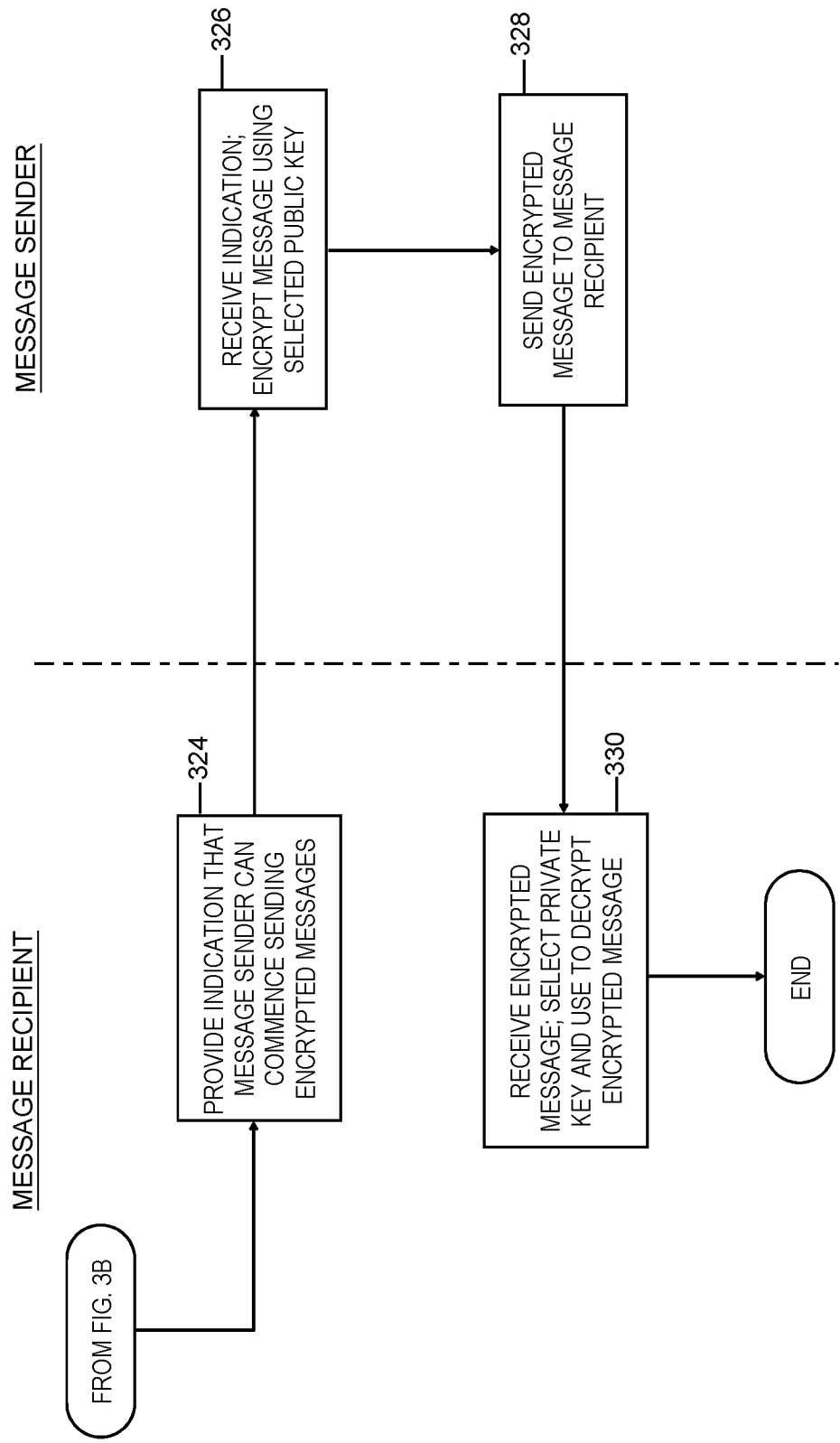

Accordingly, FIGS. 3A-3C depict an example process for cryptographic processing using a multi-factor key system and finite state machine, in accordance with aspects described herein. Aspects of the process performed from the perspective of message recipient are shown on the left sides of FIGS. 3A-3C and aspects of the process performed from the perspective of the message sender are shown on the right sides of FIGS. 3A-3C. In some examples, aspect(s) of the process is/are performed by one or more computer systems, such as those described herein, which may include one or more computer systems of a message recipient, one or more computer systems of a message sender, and/or one of more other computer systems.

Referring initially to FIG. 3A the process begins with generating a plurality of cryptographic key pairs (302) including a plurality of public keys and a plurality of private keys, each cryptographic key pair of the plurality of cryptographic key pairs including a respective public key of the plurality of public keys and a corresponding private key of the plurality of private keys. By 'corresponding' is meant that the keys of the key pair complement each other insofar as one may be used in the encryption of a message and the other may be used in the decryption of the encrypted message. The number of key pairs in the plurality can be any number, for instance 50 or more, and therefore the number of public keys may be 50 or more.

The process then provides the plurality of public keys to a message sender (304) that is to electronically transmit an encrypted message. In some examples, the keys are provided directly form the message recipient to the message sender, though it is noted that the provision need not be direct provision, i.e. the message recipient may provide the keys on a website or other entity from which message sender retrieves the public keys. It is also noted that 'message sender' and 'message recipient' are so named by virtue that the message sender is to (eventually) send encrypted message(s) to the message recipient, though such action has not yet occurred to this point in the process of FIGS. 3A-3C.

The process continues with the message sender receiving the public keys provided by the message recipient that is to receive the encrypted message, and selecting therefrom a public key (306). The process then establishes an input alphabet for a finite-state machine (308) and constructs the finite-state machine and a language over the input alphabet (310) such that the finite-state machine accepts the language. The language includes language elements. The process then encrypts a language element of the language using the selected public key (312) to provide an encrypted language element. In some examples, the language is a regular language and the FSM accepts only the elements of the regular language. Additionally or alternatively, the selection of the language element can be made in any desired manner, for example at random from the language elements of the language. The process continues (to FIG. 3B) by providing the encrypted language element and a specification of the finite-state machine to the message recipient (314). The message recipient receives, e.g. directly or indirectly from the message sender, a specification of the finite-state machine and the encrypted language element (316). The process decrypts the encrypted language element using each private key of the plurality of private keys (318), to provide a plurality of decrypted language elements. The process applies each decrypted language element of the plurality of decrypted language elements to the finite-state machine (320). This applying identifies a decrypted language element, of the plurality of decrypted language elements, that is accepted by the finite-state machine, and that decrypted language element may be the selected language element (from 312). In an example where the finite-state machine accepts more than one of the decrypted language elements, the process can return back to a prior aspect, for instance 308 or 306, as examples. This may be effected by a communication from the message recipient to the message sender.

Based on identifying the decrypted language element that is accepted by the finite-state machine, the process identifies a private key, of the plurality of private keys, used to decrypt the encrypted language element to provide that decrypted language element identified as being accepted by the finite-state machine (322). That identified private key is the one corresponding to the selected public key (from 306), and is the private key to use in decrypting message(s) from the message sender.

The process continues (to FIG. 3C) by providing an indication that the message sender can start sending encrypted message(s) (324). The message sender receives that indication and the process encrypts a message using the selected public key to provide the encrypted message to be sent to the message recipient (326). The process sends the encrypted message to the message recipient (328), which receives the encrypted message and selects the identified private key as a decryption key to use in decrypting the encrypted message from the message sender (330).

The message sender and receiver can continue exchanging messages (e.g. repeating 326, 328, 330) as desired. In some embodiments, the message sender/receiver repeat the process of FIGS. 3A-3C, or aspects thereof (for instance beginning at 306), periodically or aperiodically during a communication session to enhance security.

The most common approaches used for asymmetric encryption are RSA and ECC. An advantage of ECC over RSA is that RSA utilizes a greater number of bits to achieve security equivalent to ECC employing fewer bits. However, RSA has certain advantages over ECC, including easier and more widely deployable math operations. While 192-bit ECC encryption may be 'stronger' than 1024-bit RSA encryption, aspects described herein can achieve higher security than 192-bit ECC with an equal or lesser number of bits in RSA by way of the multiple key pairs, and the proper pair to use being identified in part using the finite-state machine. The number of keys increases but the time taken for key generation for each key is less due to the smaller key size, hence acting as a compensating factor. This reduces the demerits of RSA over ECC and with an increased number of keys, it can have higher security then ECC with a reduced key size.

In some embodiments, approaches described herein are used in situations where data transfer is expected to be considerably longer (in terms of time) when compared to the key setup time, and in such situations if public key encryption/asymmetric encryption time is the same or less than symmetric key encryption for the same level of security (due to the reduced number of bits), then data can also be encrypted with public key encryption/asymmetric encryption, or symmetric keys can be changed often with different pairs of public key encryption/asymmetric encryption keys.

For instance, in cases of a local area network or metropolitan area network configuration where potentially hundreds of nodes would send data to a mail server, the mail server can generate hundreds of key pairs and send all of the public keys to all of the nodes, rather than sending one public key to each node. Each node would select a public key from the pool and would notify the mail server, by way of the FSM procedure described herein, which public key was selected. Here, the key generation time is not changed when compared to the existing approach, because the number of keys are the same. However, the security has been increased multiple times for each node. If the number of public keys available in the collection increase to the order of thousands (for example), the bit size for each key can be reduced further.

Thus, in some example, there may be an initial determination about whether to encrypt the message using a first encryption technique (e.g. traditional scheme using a single cryptographic key pair) or using a second encryption technique (e.g. which includes the aspects described above with reference to FIGS. 3A-3C). The first technique may be preferable when the anticipated length (in time) of the message transfer is relatively low, especially given the time/resource anticipated to be consumed performing aspects of FIGS. 3A-3C to identify a key pair. If the message transfer is expected to last a relatively long time and/or involve several encrypted communications, the second technique, which may take longer setup time to perform aspects of FIGS. 3A-3C, may be preferred. Thus, the decision may be based on weighing an anticipated length of data transfer of the encrypted message against resource consumption anticipated to be consumed in identifying, for the message recipient a public key, of the plurality of public keys, to be used to encrypt the message.

Aspects described herein differ from an approach of using multiple levels/hierarchies of authentication to increase the security, for instance one-time password+biometric+key exchange. These are enforced at nodes where there is a user interacting with an interface such as a graphical user interface, but a hacker tapping the wire/network that carries the message faces only the single level of authentication, i.e. cracking the message encrypted with secret keys. In contrast, aspects described herein introduce multiple public/private key pairs which may be huge prime numbers at both the sender's and receiver's end. The identity of the proper pair to use for the message encryption would be revealed only to the two parties by way of the FSM and using the approach described herein. Even if the same information is tapped by a hacker, the approach prevents the hacker from decrypting the message. The hacker could attempt to determine multiple factors of huge modulo by factorizing all of the public keys to arrive at the private key, but this is practically impossible.

The approach proposed herein avoids increasing bit length of the prime factors, while enhancing security using a combination of multi factor keys and automata theory to increase the security 'r' times with 'r' pairs of keys.

In accordance with aspects described herein, a process performed by one or more computer systems, such as those described herein, which may include one or more computer systems sending/receiving encrypted communications, is as follows. The process selects a public key from a plurality of public keys provided by a first user, such as a message recipient, that is to receive an encrypted message, for instance from a second user. The process establishes an input alphabet for a finite-state machine, and constructs the finite-state machine and a language over the input alphabet such that the finite-state machine accepts the language, where the language includes language elements. The process encrypts a language element of the language using the selected public key to provide an encrypted language element. Then the process electronically transmits the encrypted language element and a specification of the finite-state machine to the first user, for instance the message recipient, for securely identifying the selected public key to the first user. The first user performs work on its side figure out the private key corresponding to the selected public key. That private key will be the one to use to decrypt a message to be received. The process can then encrypt a message using the selected public key to provide the encrypted message to the first user, and then electronically transmit the encrypted message to the first user message recipient.

The language can be a regular language and the finite-state machine can accept only the elements of the language.

Additionally or alternatively, the process can include randomly selecting the language element from the plurality of language elements of the language.

The electronically transmitting the encrypted message to the first user may be based on the first user sending, and the second user receiving, an indication from the first user that electronic transmission of the encrypted message is to commence.

This receipt of the indication from the first user may be based on the first user identifying the selected public key from the plurality of public keys and identifying a private key corresponding to the selected public key.

Additionally or alternatively, the process can include performing an initial attempt to securely identify an initial public key of the plurality of public keys to the first user. Based on an initial constructed finite-state machine and initial encrypted language element, decryption of the initial encrypted language element using each private key of a plurality of private keys corresponding to the plurality of public keys can provide a plurality of initial decrypted language elements that are accepted by the initial finite-state machine, thereby indicating multiple candidate public keys, of the plurality of public keys, that could be the initial public key. Based on receiving an indication from the first user that a definitive identification of the initial public key to the message recipient has failed, the method could performs the selecting the public key, the establishing the input alphabet, and the constructing the finite-state machine and language over the input alphabet.

Additionally or alternatively, the process can include initially determining whether to encrypt the message using a first encryption technique including a single cryptographic key pair or using a second encryption technique, the second encryption technique including the selecting the public key, the establishing the input alphabet, the constructing the finite-state machine and language over the input alphabet, the encrypting the language element, and the electronically transmitting the encrypted language element and specification of the finite-state machine to the message recipient.

The determining whether to use the first encryption technique or the second encryption technique may be based on weighing an anticipated length of data transfer of the encrypted message against resource consumption anticipated to be consumed in identifying, for the message recipient a public key, of the plurality of public keys, to be used to encrypt the message.

Although various examples are provided, variations are possible without departing from a spirit of the claimed aspects.

Figure 4:
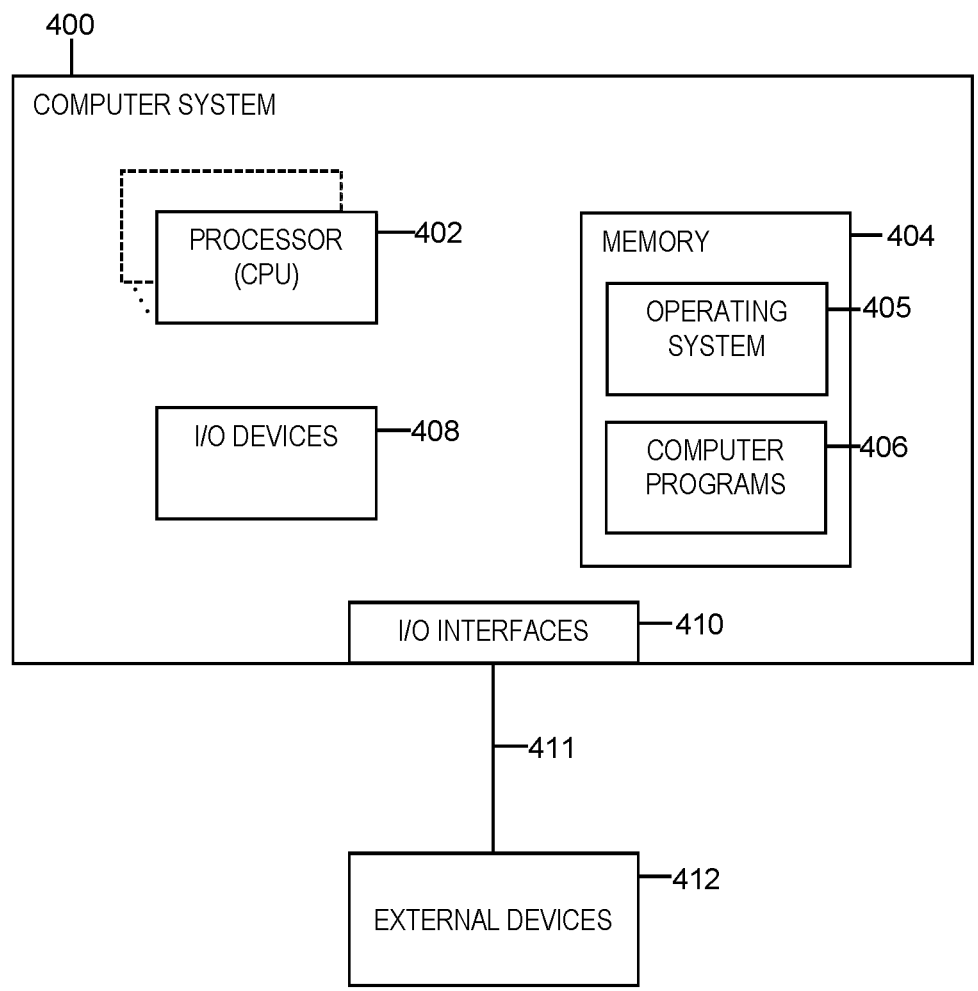
FIG. 4 depicts one example of a computer system and associated devices to incorporate and/or use aspects described herein.

Processes described herein may be performed singly or collectively by one or more computer systems, such as one or more client computing devices, as examples. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 5:
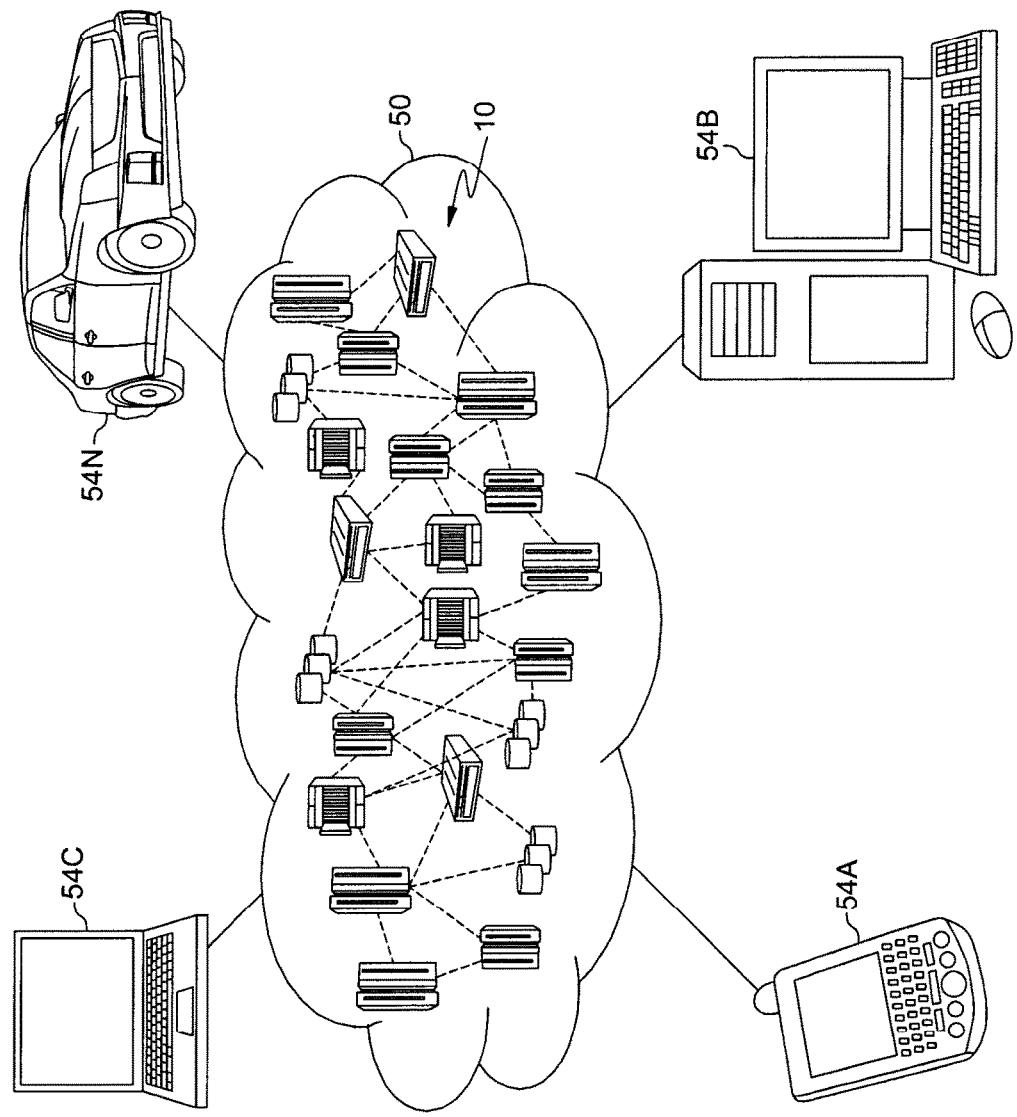
FIG. 5 depicts a cloud computing environment according to an embodiment of the present invention.

Referring now to FIG. 5, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
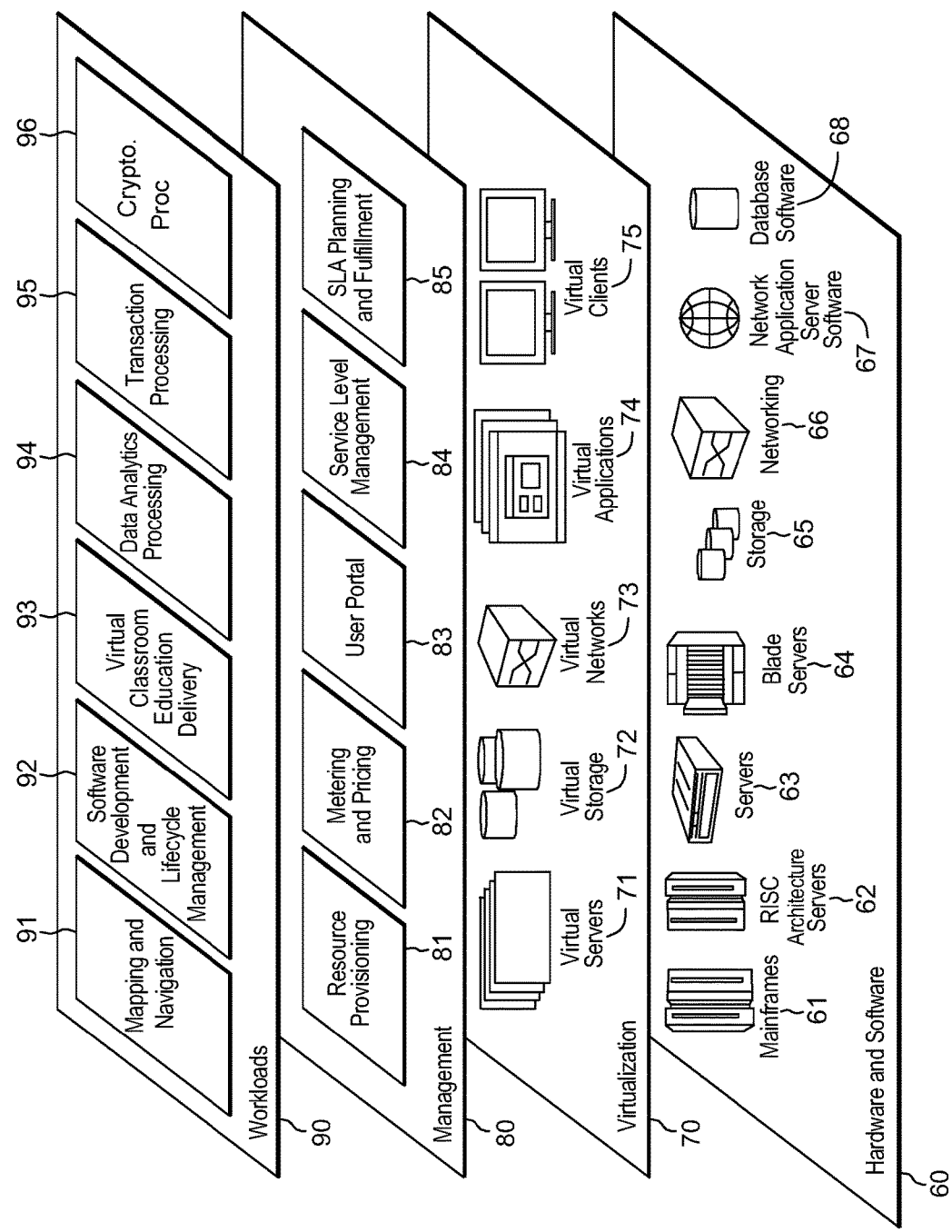
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptographic processing 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   selecting, by a first computing device, a public key from a plurality of public keys provided by a message recipient that is to receive an encrypted message over a communication network;
   establishing an input alphabet for a finite-state machine;
   constructing the finite-state machine and a language over the input alphabet such that the finite-state machine accepts the language, wherein the language comprises language elements;
   encrypting a language element of the language using the selected public key to provide an encrypted language element;
   electronically transmitting the encrypted language element and a specification of the finite-state machine to the message recipient for securely identifying the selected public key to the message recipient, wherein the message recipient comprises a second computing device;
   encrypting a message using the selected public key to provide the encrypted message to the first computing device; and
   electronically transmitting the encrypted message to the message recipient.

2. The method of claim 1, wherein the language is a regular language and the finite-state machine accepts only the elements of the language.

3. The method of claim 1, further comprising randomly selecting the language element from the plurality of language elements of the language.

4. The method of claim 1, wherein the electronically transmitting the encrypted message to the message recipient is based on receiving an indication from the message recipient that electronic transmission of the encrypted message is to commence.

5. The method of claim 4, wherein the receiving the indication from the message recipient is based on the message recipient identifying the selected public key from the plurality of public keys and identifying a private key corresponding to the selected public key.

6. The method of claim 1, further comprising performing an initial attempt to securely identify an initial public key of the plurality of public keys to the message recipient, wherein based on an initial constructed finite-state machine and initial encrypted language element, decryption of the initial encrypted language element using each private key of a plurality of private keys corresponding to the plurality of public keys provides a plurality of initial decrypted language elements that are accepted by the initial finite-state machine, thereby indicating multiple candidate public keys, of the plurality of public keys, that could be the initial public key.

7. The method of claim 6, wherein based on receiving an indication from the message recipient that a definitive identification of the initial public key to the message recipient has failed, the method performs the selecting the public key, the establishing the input alphabet, and the constructing the finite-state machine and language over the input alphabet.

8. The method of claim 1, further comprising initially determining whether to encrypt the message using a first encryption technique including a single cryptographic key pair or using a second encryption technique, the second encryption technique comprising the selecting the public key, the establishing the input alphabet, the constructing the finite-state machine and language over the input alphabet, the encrypting the language element, and the electronically transmitting the encrypted language element and specification of the finite-state machine to the message recipient.

9. The method of claim 8, wherein the determining whether to use the first encryption technique or the second encryption technique is based on weighing an anticipated length of data transfer of the encrypted message against resource consumption anticipated to be consumed in identifying, for the message recipient a public key, of the plurality of public keys, to be used to encrypt the message.

10. A computer program product comprising:
    a non-transitory computer readable storage medium readable by a processor and storing instructions for execution by the processor for performing a method comprising:
    selecting, by a first computing device, a public key from a plurality of public keys provided by a message recipient that is to receive an encrypted message over a communication network;
    establishing an input alphabet for a finite-state machine;
    constructing the finite-state machine and a language over the input alphabet such that the finite-state machine accepts the language, wherein the language comprises language elements;
    encrypting a language element of the language using the selected public key to provide an encrypted language element;
    electronically transmitting the encrypted language element and a specification of the finite-state machine to the message recipient for securely identifying the selected public key to the message recipient, wherein the message recipient comprises a second computing device;
    encrypting a message using the selected public key to provide the encrypted message to the first computing device; and
    electronically transmitting the encrypted message to the message recipient.

11. The computer program product of claim 10, wherein the language is a regular language and the finite-state machine accepts only the elements of the language.

12. The computer program product of claim 10, wherein the electronically transmitting the encrypted message to the message recipient is based on receiving an indication from the message recipient that electronic transmission of the encrypted message is to commence.

13. The computer program product of claim 12, wherein the receiving the indication from the message recipient is based on the message recipient identifying the selected public key from the plurality of public keys and identifying a private key corresponding to the selected public key.

14. The computer program product of claim 10, wherein the method further comprises initially determining whether to encrypt the message using a first encryption technique including a single cryptographic key pair or using a second encryption technique, the second encryption technique comprising the selecting the public key, the establishing the input alphabet, the constructing the finite-state machine and language over the input alphabet, the encrypting the language element, and the electronically transmitting the encrypted language element and specification of the finite-state machine to the message recipient.

15. The computer program product of claim 14, wherein the determining whether to use the first encryption technique or the second encryption technique is based on weighing an anticipated length of data transfer of the encrypted message against resource consumption anticipated to be consumed in identifying, for the message recipient a public key, of the plurality of public keys, to be used to encrypt the message.

16. A computer system comprising:
   a memory device; and
   a hardware processor in communications with the memory, wherein the computer system is configured to perform a method comprising:
   selecting, by a first computer system, a public key from a plurality of public keys provided by a message recipient that is to receive an encrypted message over a communication network;
   establishing an input alphabet for a finite-state machine;
   constructing the finite-state machine and a language over the input alphabet such that the finite-state machine accepts the language, wherein the language comprises language elements;
   encrypting a language element of the language using the selected public key to provide an encrypted language element;
   electronically transmitting the encrypted language element and a specification of the finite-state machine to the message recipient for securely identifying the selected public key to the message recipient, wherein the message recipient comprises a second computer device;
   encrypting a message using the selected public key to provide the encrypted message to the first computing device; and
   electronically transmitting the encrypted message to the message recipient.

17. The computer system of claim 16, wherein the language is a regular language and the finite-state machine accepts only the elements of the language.

18. The computer system of claim 16, wherein the electronically transmitting the encrypted message to the message recipient is based on receiving an indication from the message recipient that electronic transmission of the encrypted message is to commence.

19. The computer system of claim 18, wherein the receiving the indication from the message recipient is based on the message recipient identifying the selected public key from the plurality of public keys and identifying a private key corresponding to the selected public key.

20. The computer system of claim 16, wherein the method further comprises initially determining whether to encrypt the message using a first encryption technique including a single cryptographic key pair or using a second encryption technique, the second encryption technique comprising the selecting the public key, the establishing the input alphabet, the constructing the finite-state machine and language over the input alphabet, the encrypting the language element, and the electronically transmitting the encrypted language element and specification of the finite-state machine to the message recipient, and wherein the determining whether to use the first encryption technique or the second encryption technique is based on weighing an anticipated length of data transfer of the encrypted message against resource consumption anticipated to be consumed in identifying, for the message recipient a public key, of the plurality of public keys, to be used to encrypt the message.

* * * * *